United States Patent [19]

Gardner

[11] Patent Number: 5,428,358
[45] Date of Patent: Jun. 27, 1995

[54] APPARATUS AND METHOD FOR IONOSPHERIC MAPPING

[75] Inventor: Sheldon B. Gardner, Potomac, Md.

[73] Assignee: The United States of America as represented by the Secretary of the Navy, Washington, D.C.

[21] Appl. No.: 237,568

[22] Filed: May 3, 1994

[51] Int. Cl.$^6$ .............................................. G01S 13/00
[52] U.S. Cl. ................................. 342/26; 73/170.16; 73/170.24; 73/170.27; 364/420
[58] Field of Search .......... 342/26; 73/170.16, 170.24, 73/170.27; 364/420

[56] References Cited

U.S. PATENT DOCUMENTS

| | | | |
|---|---|---|---|
| 3,769,585 | 10/1970 | Fremouw et al. | 325/67 |
| 4,011,565 | 3/1977 | Toman | 343/112 A |
| 4,463,357 | 7/1984 | MacDoran | 343/5 W |
| 5,036,330 | 7/1991 | Imae et al. | 342/357 |
| 5,230,076 | 7/1993 | Wilkinson | 455/62 |
| 5,313,210 | 5/1994 | Gail | 342/25 |

OTHER PUBLICATIONS

Gardner et al., "*Inverse Least Square Computations of Vertical TEC Using a Calibrated GPS Ionospheric Receiver,*" 7$^{th}$ Int. Iono Effects Symp., 4–6 May 1993.
Gaposchkin et al. "*GPS Li–Lz Bias Determination,*" Tech. Rpt. 971, Mass. Inst of Tech. Lincoln Lab, pp. 1–4, 21–23, 12 Jan. 1993.
Klobucnar, "*Ionospheric Time-Delay Algorithm for Single-Frequency GPS Users,*" IEEE Trns. on Aero and Elec. Sys., vol. AES 23, No. 3, pp. 325–330, May 1987.
Coco et al., "*Variability of GPS Satellite Differential Group Delay Biases,*" IEEE Trns. on Aero. and Elec. sys., vol. 27, No. 6, pp. 931–938, Nov. 1991.
Cretcher, "*Ionospheric Effects in Navstar GPS,*" pp. 403–407.
Imae et al., "Adual Frequency GPS Receiver Measuring Ionospheric Effects Without Code Demodulation and its Application to Time Comparisons," pp. 77–84.
Fremouw et al., "*Application of Stochastic Inverse Theory to Ionospheric Tomography,*" Radio Science, vol. 27, No. 5, pp. 721–732, Sep.–Oct. 1992.
Gorbunov et al., "*Remote Sensing of the Atmosphere Using A System of Synchronously Orbiting Satellites,*" Radio Science, vol. 28, No. 4, pp. 595–602. Jul.–Aug. 1993.
Zolesi, "*Simplified Ionospheric Regional Model for Telecommunication Applications,*" Radio Science, vol. 28, No. 4, pp. 603–612, Jul.–Aug. 1993.
Lanyi et al., "*A Comparison of Mapped and Measured Total Ionospheric Electron Content Using Global Positioning System and Beacon Satellite Observations,*" Radio Sc., vol. 23, No. 4, pp. 483–492, Jul.–Aug. 1988.

*Primary Examiner*—J. Woodrow Eldred
*Attorney, Agent, or Firm*—Thomas E. McDonnell; Charles J. Stockstill

[57] ABSTRACT

This invention is a unique single-site method of determining the local total electron content (TEC) of the ionosphere and its space-time variation using a global positioning system (GPS) ionospheric receiver. The TEC of the ionosphere is specified in terms of a space-time map of the local TEC in the vicinity of the receiver. Differential group and phase path data between two L-band frequencies (L1 and L2) for a plurality of the GPS satellites in view of the receiver station are analyzed by a least squares technique to extract both the ten parameters of a full second order space-time polynomial expansion for the vertical TEC (VTEC) and the differential delay biases associated with the space vehicles (SVs). The method is applicable to day and nighttime data.

9 Claims, 2 Drawing Sheets

APPARATUS AND METHOD FOR IONOSPHERIC MAPPING

BACKGROUND OF THE INVENTION

1. Field of the Invention

This invention generally is an apparatus and method for ionospheric mapping and more specifically the obtaining of a detailed spatial and temporal ionospheric mapping utilizing information received from global positioning system (GPS) satellites by ground-based GPS receivers.

2. Description of Related Art

Over the past several years, with the availability of a full constellation of global positioning system (GPS) satellites, the use of calibrated GPS receivers for global ionospheric measurements has become feasible. The theory of the GPS is based on measuring the travel time, $\Delta t$, of a signal from the satellite to a receiver.

Measurement of the integrated ionospheric path delay can be accomplished because the index of refraction in the ionosphere has sufficient dispersion at L-band frequencies. To deal with ionospheric path delay, the GPS provides travel time, i.e., ranging data at two frequencies, by cross-correlation between the P-code (precise code) signals of the two frequencies without demodulating the P-code signal. These are the L1 and L2 frequencies: 1575.42 MHz and 1227.6 MHz. One of the major difficulties encountered has been the determination of the L1-L2 spacecraft biases for each of the GPS satellites.

A comparison of preflight calibration and analysis of data from the GPS satellites show that there is an instrument delay time bias between $L_1$ and $L_2$ frequencies which differs for each satellite. A constant L1-L2 bias would result in a constant error in the ionospheric path delay determination and range measurements.

A method of determining the SV bias has been the measurement of the ionospheric total electron content (TEC) over several simultaneous propagation paths. This TEC is a function of many variables including long and short term changes in solar ionizing flux, magnetic activity, season, time of day, user location and viewing direction. Under typical conditions, continuous slant path TEC data can be measured simultaneously from several GPS satellites over a period of 90-120 minutes. One of the important factors limiting the measurement of ionospheric TEC using calibrated GPS receivers is the uncertainty in the measurements caused by differential L2-L1 instrumental delay biases in both the satellite transmitters and the receivers. The receiver bias errors require that the receiver be returned to the manufacturer on a periodic basis for recalibration, a procedure that is expensive and results in the loss of an expensive piece of equipment for an extended period of time. Another method requires use of expensive GPS simulator equipment.

Several researchers have proposed methods for determining the space craft biases and ionospheric time-delay and therefore a usable mapping of the ionosphere have been attempted. However, these attempts have resulted in techniques that have high error rates or require large investments in equipment spread over the world. The most accurate system of ionospheric mapping in use today was developed by the Jet Propulsion Laboratory (JPL) of the California Institute of Technology in Pasadena, Calif. This system consists of a global network of tens of receivers for use in calibrating the JPL Deep Space Network (DSN).

SUMMARY OF THE INVENTION

The object of this invention is to provide a method and apparatus utilizing a single global positioning system (GPS) receiver to obtain data from the GPS for space-time modelling of the ionosphere in the neighborhood of the receiver.

Another object of this invention is to provide a method of determining GPS L1-L2 space vehicle (SV) bias using an ionospheric model to reduce requirements for averaging multisite GPS data.

An object of this invention is to provide an economical method and apparatus for obtaining an ionospheric map during both daylight and nighttime hours.

An object of this invention is to utilize GPS measurements and inverse least squares (ILS) techniques to develop local ionospheric models for ray tracing.

Another object of this invention is to provide a method for utilizing ILS computational techniques for mitigation of ionospheric effects.

This invention is a single-site apparatus and method for determining the local total electron content (TEC) of the ionosphere and its space-time variation using a global positioning system (GPS) ionospheric receiver. Differential group and phase path data between two L-band frequencies (L1 and L2) for a plurality of the GPS satellites in view of the receiver station are analyzed by a least squares technique to extract both the ten parameters of a full second order space-time polynomial expansion for the vertical TEC (VTEC) and the differential delay biases associated with the space vehicles (SVs). From the computed VTEC an ionospheric map at the receiving station can be computed.

DESCRIPTION OF THE PREFERRED EMBODIMENT

Figure 1:
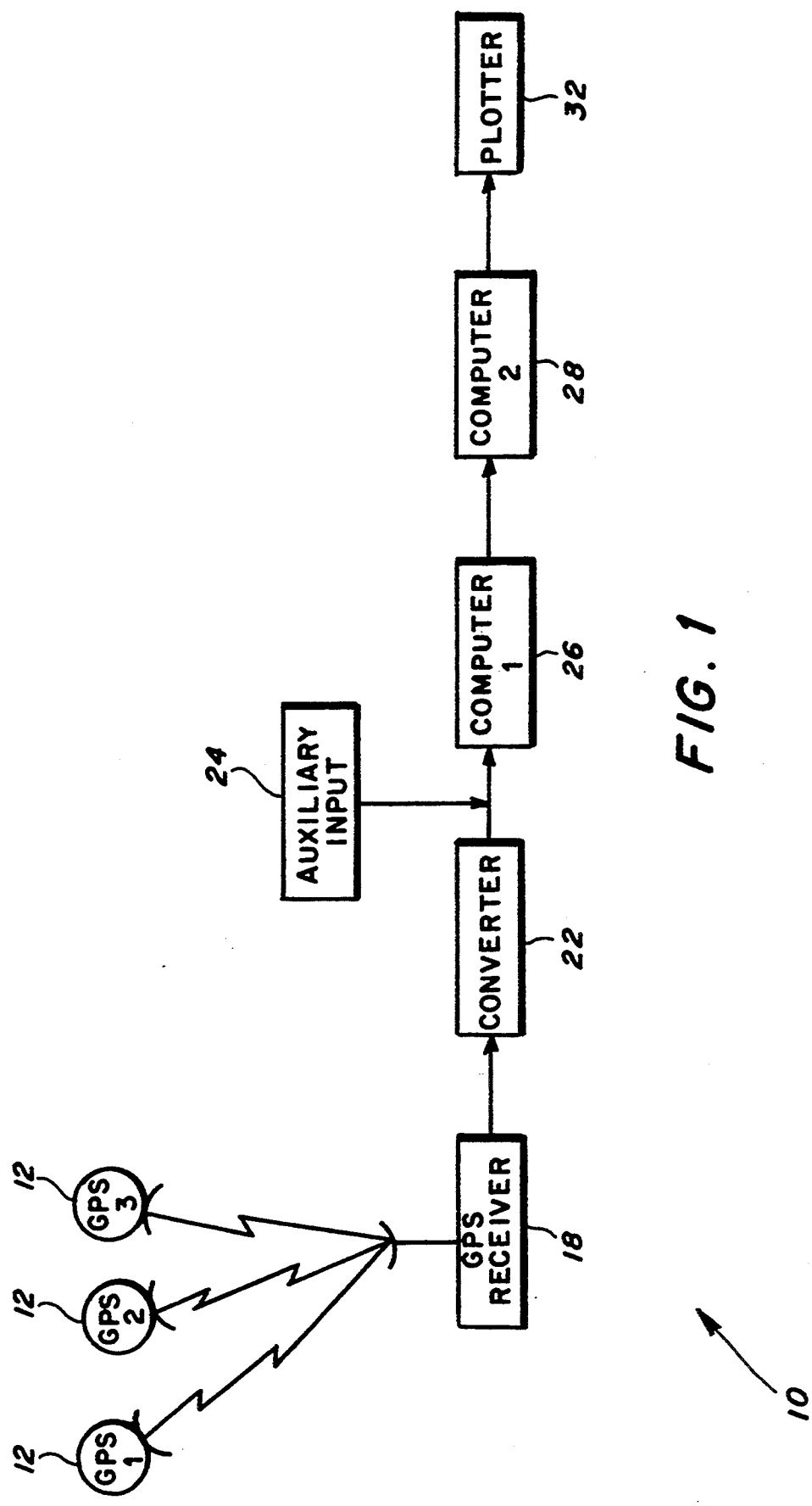
FIG. 1 shows the system architecture for the apparatus for constructing a space-time map of the total electron content (TEC) of the ionosphere utilizing a plurality of computers.

A first preferred embodiment for the ionospheric mapping system 10 is shown in FIG. 1. Data transmitted in a compressed binary code from a plurality of GPS satellites 12, preferably five, on the satellite L1 and L2 frequencies, is received by an ionospheric receiver 18, such as a Model ICS-4Z, manufactured by Allen Osborne Associates of Westlake Village, Calif. Any similar receiver may be utilized as long as it is capable of receiving and storing GPS downlink data. The information received from the GPS satellites regarding the L1 and L2 frequencies is comprised of the GPS signal source parameters, i.e., group path length and carrier phase.

The compressed binary format data transmission is received in the GPS receiver 18 and stored in a storage unit 22, comprised of non-volatile random access memory (RAM), for a predetermined period of time as binary-packed standard (STD) formatted data. The data storage period is nominally two or more hours, however shorter periods may be selected at the risk of obtaining less accurate results. The compressed binary format data transmission is comprised of information on the group path delay, phase path delay, and the satellite ephemeris information concerning the orbit of a particular satellite.

At the end of the predetermined period, the stored data files in the binary-packed STD format are uploaded directly to a computer 26 at a predetermined baud rate utilizing either a modem (not shown) connection to telephone lines or dedicated cabling between the receiver storage unit 22 and computer 26. Control of the system operation is accomplished through an auxiliary input 24, which may be a part of the computer 26 or a separate control unit adjacent to or remotely located in relation to the other equipment.

The ephemeris data is included, generally, at the end of any data upload, so there is no need to obtain a separate ephemeris data upload. The computer 26 then decompresses the uploaded binary-packed STD formatted data and converts it to an American Standard Code for Information Interchange (ASCII) format, a procedure that is well known to the art. Using the ASCII data, the computer 26 decrypts the message consisting of GPS information for each particular satellite and reads the group path delay and phase path delay and adjusts the average of phase path delay to the average of the group path delay thereby removing the $2\pi$ ambiguity in the phase path delay (out of phase data). The decryption procedure is well known to the art. Phase path delay data is of higher precision than the group path delay data and is less susceptible to multipath defects.

The basic propagation equation for the group path length (GPL) at L1 and L2 frequencies is $$GpL = R + (40.3)(TEC)/f^2 \qquad (1)$$

where R is the range, including free space and tropospheric contributions to the range, which are frequency independent; and the second term, $(40.3)(TEC)/f^2$, is the ionospheric contribution in meter kilogram seconds (MKS) units, where TEC is the total electron content along the transmission path of the GPS satellite and f is the wave frequency. The equation for the phase path length (PPL) is identical to that for group path delay, except the ionospheric term is a negative term in the equation.

By differencing GPS receiver measurements of GPL at L1 and L2 frequencies (L2-L1), and dividing by the speed of light, the resulting differential group path delay (DGPD), $\tau_{21}$, isolates the ionospheric term, along with differential delay bias terms for space vehicle (SV) and receiver, as shown by the formula:

$$\tau_{21} = (0.350)VTEC(x_1,y_1,t)SF(i,t) + RBias + SVias(i) \qquad (2)$$

where the index i and t refer to the path for SV i at time t, VTEC is an approximated TEC term as the product of vertical TEC (VTEC) at the coordinates of the ionospheric pierce point, which is defined as the point along the path where the altitude is 350 km. above a spherical earth, and SF(i,t,), the slant or obliquity factor, which is taken to be the cosecant of the elevation angle of the path at this point. See, Klobuchar, *Ionospheric time-delay algorithm for single-frequency GPS users*, IEEE Trans. Aero. Electron. Syst. 23, 3, pp. 325-331, 1987, which is hereby incorporated by reference. Differential delay units are nanoseconds (ns), and TEC units are $10^{16}$ electrons per square meter in the Eq.(2). The latitude and longitude separations if the intercept point from the receiver location are denoted by $x_i$ and $y_i$, respectively. The equation for differential phase path delay (DPPD) is identical, except for a minus sign in front of the ionospheric term and the addition of a constant term reflecting the baseline ambiguity for phase.

Table 1 is illustrative of the decompressed data set downloaded from the storage unit 22 of the receiver 18 to the computer 26. In this illustration 240 samples per GPS satellite (approximately two hours of sampling at 30 second intervals) have been stored in the storage unit 22. Columns 23 and 24 are the values of the group and phase TEC. Table 2a and the subsequent Tables 2b through 5 illustrate a typical computation of VTEC on a Mcintosh computer. The formula:

$$\tau = \left[ \frac{(P_2 - P_1)}{0.299792458} - \omega \right] 2.853 \qquad (3)$$

is used to compute the group path delay, $\tau$, in TEC units, where $P_2$ and $P_1$ are the path lengths of the frequencies $L_1$ and $L_2$, 0.299792458 is the speed of light in meters per nanosecond, and $\omega$ is the receiver delay (nominally a negative term).

In Table 2b, the phase path delay length, PPD, is in TEC units and computed using the formula:

$$PPD = \frac{(L_1 - L_2)}{0.299792458} \times 2.853 \qquad (4)$$

where $L_1$ and $L_2$ are the phase path delays of frequencies $L_1$ and $L_2$. It will be noted that eq.(4) differs from eq.(3) in that there is no receiver delay present.

TABLE 1

| 1 BLOCK TYPE | 2 GPS WEEK | 3 GPS TIME | 4 DAY | 5 HR | 6 MIN | 7 SEC | 8 SAT # |
|---|---|---|---|---|---|---|---|
| 11 | 703 | 313800 | 3 | 11 | 10 | 0 | 2 |
| 13 | 703 | 313830 | 3 | 11 | 10 | 30 | 2 |
| 11 | 703 | 313860 | 3 | 11 | 11 | 0 | 2 |
| 11 | 703 | 313890 | 3 | 11 | 11 | 30 | 2 |
| 11 | 703 | 313920 | 3 | 11 | 12 | 0 | 2 |
| 11 | 703 | 313950 | 3 | 11 | 12 | 30 | 2 |
| 11 | 703 | 313980 | 3 | 11 | 13 | 0 | 2 |
| 11 | 703 | 314010 | 3 | 11 | 13 | 30 | 2 |
| 11 | 703 | 314040 | 3 | 11 | 14 | 0 | 2 |

| 9 FLAG | 10 SAMPLE RATE | 11 SNR-1 | 12 P1 | 13 P1-error | 14 L1 | 15 L1-error |
|---|---|---|---|---|---|---|
| 16777216 | 30 | 238 | 18456241.9 | 0.0127 | −3488856 | 0.0001 |
| 16777216 | 30 | 225 | 18442695.3 | 0.0134 | −3502402.6 | 0.0001 |
| 16777216 | 30 | 214 | 18429235.1 | 0.0141 | −3515862.4 | 0.0001 |

TABLE 1-continued

| | | | | | | |
|---|---|---|---|---|---|---|
| 16777216 | 30 | | 202 | 18415859.6 | 0.0149 | −3529237.9 0.0001 |
| 16777216 | 30 | | 202 | 18402567.6 | 0.0149 | −3542529.8 0.0001 |
| 16777216 | 30 | | 202 | 18389360.9 | 0.0149 | −3555736.6 0.0001 |
| 16777216 | 30 | | 202 | 18376240.3 | 0.0149 | −3568857.1 0.0001 |
| 16777216 | 30 | | 214 | 18363210.7 | 0.0141 | −3581886.9 0.0001 |
| 16777216 | 30 | | 225 | 18350275.1 | 0.0134 | −3594822.6 0.0001 |

| 16 L1-bias | 17 SNR-2 | 18 P2 | 19 P2-error | 20 L2 | 21 L2-error |
|---|---|---|---|---|---|
| 115322291 | 154 | 18456242.6 | 0.0196 | −3488854.6 | 0.0001 |
| 115322291 | 154 | 18442696.2 | 0.0196 | −3502401.2 | 0.0001 |
| 115322291 | 158 | 18429236.3 | 0.0191 | −3515861 | 0.0001 |
| 115322291 | 163 | 18415860.9 | 0.0185 | −3529236.5 | 0.0001 |
| 115322291 | 167 | 18402569.2 | 0.0181 | −3542528.3 | 0.0001 |
| 115322291 | 167 | 18389362.3 | 0.0181 | −3555735.2 | 0.0001 |
| 115322291 | 172 | 18376242 | 0.0176 | −3568855.6 | 0.0001 |
| 115322291 | 177 | 18363212.2 | 0.0171 | −3581885.5 | 0.0001 |
| 115322291 | 177 | 18350276.5 | 0.0171 | −3594821.1 | 0.0001 |

| 21 L2-error | 22 L2-bias | 23 TEC_tau | 24 TEC_phase | 25 Adj Phase | 26 |
|---|---|---|---|---|---|
| 0.0001 | 89861533 | 13.6431899 | −13.864711 | 18.5112753 | |
| 0.0001 | 89861533 | 15.3285768 | −13.868517 | 18.5074687 | |
| 0.0001 | 89861533 | 17.4108053 | −13.880889 | 18.4950971 | |
| 0.0001 | 89861533 | 18.8373412 | −13.899922 | 18.476064 | |
| 0.0001 | 89861533 | 21.8008054 | −13.912294 | 18.4636924 | |
| 0.0001 | 89861533 | 20.6169424 | −13.918004 | 18.4579825 | |
| 0.0001 | 89861533 | 22.5592771 | −13.93894 | 18.437046 | |
| 0.0001 | 89861533 | 20.9167148 | −13.948457 | 18.4275294 | |
| 0.0001 | 89861533 | 20.4875168 | −13.952263 | 18.4237228 | |

TABLE 2

=((RC[−5]−RC(−11])/0.299792458 + 2.3)*2.853

630S2,2

| 19 P2-error | 20 L2 | 21 L2-error | 22 L2-bias | 23 TEC_tau |
|---|---|---|---|---|
| 242.6 0.0196 | −3488854.6 | 0.0001 | 89861533 | 13.6431899 |

=((RC[−10]−RC[−4])/0.299792458)*2.853

630S2,27,15,19,31.

| 19 P2-error | 20 L2 | 21 L2-error | 22 L2-bias | 23 TEC_tau | 24 TEC_phase |
|---|---|---|---|---|---|
| 42.6 0.0196 | −3488854.6 | 0.0001 | 89861533 | 13.6431899 | −13.864711 |

R242C24 | | =SUM(R[−240]C:R[−1]C)/240

| 20 | 21 | 22 | 23 | 24 |
|---|---|---|---|---|
| −3616962.9 | 0.0001 | 89861533 | 23.5470985 | −7.3858206 |
| | | AVG | 19.225713 | −13.150273 |

R242C23 | | =SUM(R[−240]C:R[−1]C)/240

| 18 | 19 | 20 | 21 | 22 | 23 |
|---|---|---|---|---|---|
| 18328138.1 | 0.0196 | −3616962.9 | −0.0001 | 89861533 | 23.5470985 |
| | | | | AVG | 19.225713 |

=RC[−1]−R242C24 + R242C23

630S2,27,15,19,31.ext

| 19 P2-error | 20 L2 | 21 L2-error | 22 L2-bias | 23 TEC_tau | 24 TEC_phase | 25 Adj Phase |
|---|---|---|---|---|---|---|
| 242.6 0.0196 | −3488854.6 | 0.0001 | 89861533 | 13.6431899 | −13.864711 | 18.5112753 |

Tables 2c and 2d is a sample computation of the average group and phase path delay over the 240 samples in columns 23 and 24, respectively.

The computations shown in Table 2e adjust the phase data using the averages from Columns 23 and 24 to remove the n(2π) ambiguity, thereby adjusting the phase path delay data so that its average agrees with the average of the group path delay data. The value shown in Column 25, slant TEC or adjusted phase data, is the final slant TEC used for further computations. (In the illustrated example, the value is 18.511 TEC units.)

Tables 3a and 3b show the satellite location; the latitude (LAT) and longitude (LONG) of pierce points (LAT-PP and LONG-PP) is computed using the earth angle, A, (Column 9) and the LAT and LONG of the satellite (Columns 7 and 8, respectively). The earth angle, A, in degrees, is computed by the formula:

$$A = 90 - \beta - \sin^{-1}\left[\frac{f_0}{f_0 + h}\cos\beta\right] \quad (5)$$

where $\beta$ is the elevation of the satellite in degrees, $r_0$ is the radius of the earth, and h is the height of the ionosphere in kilometers. The LAT-PP, $\phi_I$, and LONG-PP, $\lambda_I$, are computed using the formulas:

$$\phi_I = \sin^{-1}[\sin\phi_0 \cos A + \cos\phi_0 \sin A \cos A_z] \quad (6)$$

-continued $$\lambda_I = \lambda_0 + \text{SIN}^{-1}\left[\frac{\text{SIN}A\text{SIN}A_z}{\text{COS}\phi_I}\right] \quad (7)$$

respectively, where $\phi_0$ is the receiver latitude (DLat), $\lambda_o$ is receiver longitude (DLong), $\phi_I$ is the pierce point latitude and $A_z$ is satellite azimuth angle. The vertical TEC factor, or slant TEC factor, is computed using the formula:

$$VTEC\text{factor} = 1 + 2\left(\frac{96 - \beta}{90}\right)^3 \quad (8)$$

where the VTEC factor is a correction factor for ionospheric elevation angle. The expressions for VTEC factor; slant TEC; Lat-PP-$\phi_0$; and Long-PP-$\lambda_0$, shown in Table 4, are then applied to a second computer 28.

A complete second order space-time model for VTEC is given by the equation $$VTEC(x,y,t) = VTEC_0 + a_1t + a_2t^2 + a_3x + a_4x^2 + a_5xt + a_6y + a_7y^2 + a_8yt + a_9xy \quad (9)$$

where $VTEC_0$ is the value at the receiver at the measuring location at a reference time t=0, x is deviation in latitude, and y is deviation in longitude. In eq.(9), the coefficients $VTEC_0$, $a_{1-a9}$, and SV biases are computed using the method of inverse least squares. Equation (9) indicates that ten coefficients are required for the second order space-time expansion. A typical TABLE 3a

| | 1 | 2 | 3 | 4 | 5 | 6 |
|---|---|---|---|---|---|---|
| 1 | OrbiTrack Track - 07/01/93 1319:57 | | | | | |
| 2 | | | | | | |
| 3 | Station: Washington DC | | | | | |
| 4 | | | | | | |
| 5 | Pass - From: Wed 06/30/93 11:10:00 AM EDT | | | | | |
| 6 | To: Wed 06/30/93 01:09:30 PM EDT | | | | | |
| 7 | | | | | | |
| 8 | PRN02 | | | | | |
| 9 | Time | EDT | | Az | El | Range | Height |
| 10 | MM/DD/YY | HH:MM:SS | | Deg | Deg | km | km |
| 11 | | | | | | | |
| 12 | 6/30/93 | 11:10:00 AM | | 287.2 | 20.1 | 23992 | 20476.2 |

| | 6 | 7 | 8 | 9 | 10 | 11 |
|---|---|---|---|---|---|---|
| 9 | Height | North | West | Earth Angle | Lat -PP | Long -PP |
| 10 | km | Lat | Long | | | |
| 11 | | | | | | |
| 12 | 20476.2 | 32.32 | 148.44 | 7.00328903 | 40.5642317 | −85.837409 |
| 13 | 20475.7 | 32.5 | 148.37 | 6.94660944 | 40.576544 | −85.757867 |
| 14 | 20475.2 | 32.68 | 148.29 | 6.91851639 | 40.58258 | −85.718402 |
| 15 | 20474.7 | 32.86 | 148.22 | 6.8628173 | 40.5944159 | −85.640077 |
| 16 | 20474.2 | 33.03 | 148.14 | 6.80775901 | 40.6059419 | −85.562549 |
| 17 | 20473.7 | 33.21 | 148.07 | 6.78046701 | 40.6115906 | −85.524082 |
| 18 | 20473.2 | 33.39 | 147.99 | 6.72635106 | 40.622663 | −85.447731 |
| 19 | 20472.7 | 33.57 | 147.91 | 6.69952465 | 40.6280881 | −85.409845 |
| 20 | 20472.1 | 33.74 | 147.83 | 6.64632889 | 40.63872 | −85.334646 |
| 21 | 20471.6 | 33.92 | 147.75 | 6.61995714 | 40.6439281 | −85.297331 |

| | 12 | 13 | 14 | 15 |
|---|---|---|---|---|
| 9 | VTEC factor | STEC | DLAT | DLONG |
| 10 | | | | |
| 11 | | | | |
| 12 | 2.19957607 | 37.6195205 | 1.74283171 | −8.823509 |
| 13 | 2.19011822 | 37.5015149 | 1.75514398 | −8.7439669 |
| 14 | 2.185408 | 37.3968324 | 1.76118003 | −8.7045019 |
| 15 | 2.17602487 | 37.2854884 | 1.7730159 | −8.6261768 |
| 16 | 2.16669138 | 37.1674828 | 1.78454189 | −8.5486495 |
| 17 | 2.16204321 | 37.0323473 | 1.79019057 | −8.5101815 |
| 18 | 2.15278395 | 36.8686621 | 1.80126297 | −8.4338305 |
| 19 | 2.14817282 | 36.6983152 | 1.80668815 | −8.3959447 |
| 20 | 2.13898748 | 36.5155968 | 1.81732 | −8.3207462 |
| 21 | 2.13441324 | 36.3928329 | 1.82252808 | −8.2834308 |

| =90 − RC[−5] − (180/3.1415)*ASIN(6368/(6368 + 350)*COS(RC[−5]*3.1415/180))
Track 630S2,27,15,19,3

| 3 | 4 | 5 | 6 | 7 | 8 | 9 |
|---|---|---|---|---|---|---|
| | El | Range | Height | North | West | Earth Angle |
| | Deg | km | km | Lat | Long | |
| 287.2 | 20.1 | 23992 | 20476.2 | 32.32 | 148.44 | 7.00328903 |

=180/3.1415*ASIN(SIN(38.8218*3.145/180)*COS(RC[−1]*3.1415/180)|
  +COS(38.8218*3.1415/180)*SIN(RC[−1]*3.1415/180)*COS(RC[−7]*3.1415/180))

| | 4 | 5 | 6 | 7 | 8 | 9 | 10 |
|---|---|---|---|---|---|---|---|
| | El | Range | Height | North | West | Earth Angle | Lat -PP |
| | Deg | km | km | Lat | Long | | |
| 87.2 | 20.1 | 23992 | 20476.2 | 32.32 | 148.44 | 7.00328903 | .1415/180)) |

=282.9822 − 360 + (180/3.1415)*ASIN(SIN(3.1415/180*RC[−2])*
  SIN(RC[−]*3.1415/180)/COS(RC[−1]*3.1415/180))

| 8 | 9 | 10 | 11 | 12 |

TABLE 3a-continued

| West Long | Earth Angle | Lat -PP | Long -PP | VTEC factor |
|---|---|---|---|---|
| 32.32  148.44 | 7.00328903 | 40.5642317 | −85.837409 | 2.19957607 |

TABLE 4

R12C12 | | =1 + 2*((96 − RC[−8])/90)*3

| | 8 | 9 | 10 | 11 | 12 |
|---|---|---|---|---|---|
| 9 | West Long | Earth Angle | Lat -PP | Long -PP | VTEC factor |
| 10 | | | | | |
| 11 | | | | | |
| 12 | 148.44 | 7.00328903 | 40.5642317 | −85.837409 | 2.19957607 |

R12C13 | | 37.6195205060755

| | 8 | 9 | 10 | 11 | 12 | 13 |
|---|---|---|---|---|---|---|
| | West Long | Earth Angle | Lat -PP | Long -PP | VTEC factor | STEC |
| | 148.44 | 7.00328903 | 40.5642317 | −85.837409 | 2.19957607 | 37.6195205 |

R12C14 | | =RC[−4] − 38.8214

| | 10 | 11 | 12 | 13 | 14 |
|---|---|---|---|---|---|
| 9 | Lat -PP | Long -PP | VTEC factor | STEC | DLAT |
| 10 | | | | | |
| 11 | | | | | |
| 12 | 40.5642317 | −85.837409 | 2.19957607 | 37.6195205 | 1.74283171 |

R12C15 | | =RC[−4] + 77.0139

| | 11 | 12 | 13 | 14 | 15 |
|---|---|---|---|---|---|
| 9 | Long -PP | VTEC factor | STEC | DLAT | DLONG |
| 10 | | | | | |
| 11 | | | | | |
| 12 | −85.837049 | 2.19957607 | 37.6195205 | 1.74283171 | −8.823509 | run consists of two hours of continuous data from five GPS satellites sampled at 30 second intervals. This gives a total of 1200 values of Eq. (1), which are used to determine ten expansion coefficients and five unknown SV values. For the solution of this problem, a discrete inverse theory method, as described in Menke, *Geophysical Data Analysis: Discrete Inverse Theory*, Academic Press, New York, N.Y., 1989, which is hereby incorporated by reference, is utilized. Letting $d=\{d_1, d_2, d_3 ... d_N\}^T$ represent the data vector of $\tau_{21}$ values in Eq. (2), and $m=\{m_1, m_2, m_3 ... m_M\}^T$ represent the model parameters given by the unknown biases in Eq.(2) and the expansion coefficients in EQ.(9). Then, Eq.(2) is a linear equation of the form of the equation $$d = Gm \tag{10}$$

where G is a M×n matrix determined by the model known as the data kernel. (For an explanation of the matrix known as the data kernel refer to Menke, id.)

The least squares solution to Eq.(10), where all the data is weighted equally, is shown in Menke, i.d. The equation $$m^{est} = (G^T G)^{-1} G^T d \tag{11}$$

solves for SVBias(i)+Rbias, $VTEC_0$ and the coefficients $a_1$–$a_9$. Note that the model parameters for SV delay biases occur only in combination with receiver bias, so that a separate calibration of the receiver bias is necessary for the determination of the SVBias(i) terms. For further information, refer to a paper by S. B. Gardner entitled *Inverse Least Squares Computations of Vertical TEC Using a Calibrated GPS Ionospheric Receiver*, presented at the 7th International Ionospheric Effects Symposium, May 4–6, 1993, in Alexandria, Va., which is hereby incorporated by reference.

The second-order space-time expansion of VETC, can be regarded as a Taylor series expansion about a space-time origin at the center of a run data set. Hence, in order to check the validity of this expansion, the solution may be recast as an expansion about this point and inspect the convergence rate of successfully higher order terms. Alternatively, the stability of the zeroth and first order terms in the Taylor series expansion can be checked, when data is removed near the boundary of the expansion region. One should restrict the data sets according to such a stability criterion.

The computed TEC from the plurality of satellites 12 applied to the second computer 28 utilizing any computer program for solution of the matrices, G, eq.(10), thereby, providing the 15 coefficients comprising the vector m which represent 10 ionospheric parameters and biases of the five spacecraft. It is to be noted, that the number of biases obtained is directly related to the number of spacecraft providing data. A preferred program for this computation sequence is MATHEMATICA, manufactured by Wolfram Research, Inc. of Champaign, Il.

Figure 2:
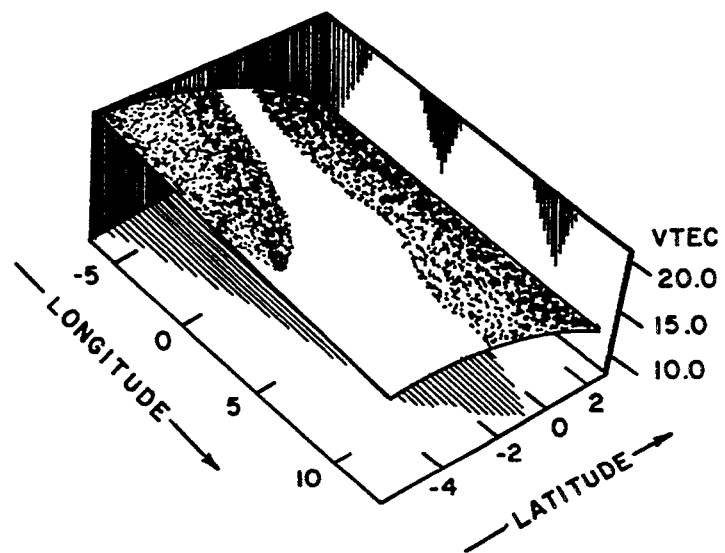
FIG. 2 depicts a typical ionospheric plot of VETC utilizing the utilizing the least squares solution.

In the second computer 28, the vertical total electron content (VTEC) of the ionosphere is computed , as shown in eq.(9), using the inverse least squares (ILS) method modelling of the temporal and spatial behavior of the atmosphere to second order (quadratic gradients) without any additional assumptions as to spatial or temporal stability. The VTEC values are then utilized to construct an ionospheric map which may be displayed either on the screen of the second computer 26 or a plotter 32 which generates an x-y-z plot of the VTEC in reference to the latitude and longitude of the observing station. A typical presentation of the ionospheric map is depicted in FIG. 2.

The Mcintosh MATHEMATICA code used to perform the inverse least squares computation in the illustration is shown in Table 5. This code matches the foregoing formulas and results in the vector m containing the fifteen coefficients shown in Table 6. In order, from left to right, these are the ten ionospheric parameters and the five spacecraft biases.

The model maps ionospheric slant TEC to vertical TEC, which involves the choice of an ionospheric intercept point along the path at a particular height and the cosecant of the elevation angle at this point. This approximation is a familiar one, often used by those practicing the art, but the height of this point is ambiguous by tens of kilometers, and the answer for vertical TEC, particularly its space-time variation, depends significantly on the choice of an intercept point. It has been suggested by some in the art that a value of ionospheric intercept should be around 420 km, based on analysis of polarity data. For prediction of DPPD data it is not a significant issue, because different intercept heights map into nearly the same DPPD prediction, as forced by the ILS fitting of GPS data. It is to be noted that the DPPD prediction errors are much smaller than the transmitter and receiver bias uncertainties, which amount to about 1 TEC unit for a collection of approximately eleven days' data, which thus represents the error of slant TEC prediction by this technique. These bias errors are made smaller by increasing the data base and using a multipath template.

TABLE 5

```
MAT1=ReadList["76S2,27,15,31,19EXP-425.TXT", {Number,Number,Number,Number}];
Dimensions[MAT1]
{1200, 4}
j=240;k=240;
VFAC1=Table[MAT1[[i,1]] ,{i,1,j}];VFAC1=Take[VFAC1, {1,k}];
VFAC2=Table[MAT1[[i,1]] ,{i,1+j,2*j}];VFAC2=Take[VFAC2, {1,k}];
VFAC3=Table[MAT1[[i,1]] ,{i,2*j+1,3*j}];VFAC3=Take[VFAC3, {1,k}];
VFAC4=Table[MAT1[[i,1]] ,{i,3*j+1,4*j}];VFAC4=Take[VFAC4, {1,k}];
VFAC5=Table[MAT1[[i,1]] ,{i,4*j+1,5*j}];VFAC5=Take[VFAC5, {1,k}];
T1=Table[MAT1[[i,2]],{i,1,j}];T1=Take[T1, {1,k}];
T2=Table[MAT1[[i,2]],{i,j+1,2*j}];T2=Take[T2, {1,k}];
T3=Table[MAT1[[i,2]],{i,2*j+1,3*j}];T3=Take[T3, {1,k}];
T4=Table[MAT1[[i,2]],{i,3*j+1,4*j}];T4=Take[T4, {1,k}];
T5=Table[MAT1[[i,2]],{i,4*j+1,5*j}];T5=Take[T5, {1,k}];
Lat1=Table[MAT1[[i,3]],{i,1,j}];Lat1=Take[Lat1, {1,k}];
Lat2=Table[MAT1[[i,3]],{i,j+1,2*j}];Lat2=Take[Lat2, {1,k}];
Lat3=Table[MAT1[[i,3]],{i,2*j+1,3*j}];Lat3=Take[Lat3, {1,k}];
Lat4=Table[MAT1[[i,3]],{i,3*j+1,4*j}];Lat4=Take[Lat4, {1,k}];
Lat5=Table[MAT1[[i,3]],{i,4*j+1,5*j}];Lat5=Take[Lat5, {1,k}];
Long1=Table[MAT1[[i,4]],{i,1,j}];Long1=Take[Long1, {1,k}];
Long2=Table[MAT1[[i,4]],{i,1+j,2*j}];Long2=Take[Long2, {1,k}];
Long3=Table[MAT1[[i,4]],{i,2*j+1,3*j}];Long3=Take[Long3, {1,k}];
Long4=Table[MAT1[[i,4]],{i,3*j+1,4*j}];Long4=Take[Long4, {1,k}];
Long5=Table[MAT1[[i,4]],{i,4*j+1,5*j}];Long5=Take[Long5, {1,k}];
ZERO=Table[0,{x,1,k}];UNIT=Table[1,{x,1,k}];
RAMP=Table[(x−1)/(k=1), {x,1,k}];
RAMP2=Table[(x−1) 2/(k−1) 2, {x,1,k}];
Lat=Transpose[Join[VFAC1*Lat1, VFAC2*Lat2,VFAC3*Lat3,
VFAC4*Lat4,VFAC5*Lat5]];
LatSQ=Transpose[Join[VFAC1*Lat1 2,VFAC2*Lat2 2,VFAC3*Lat3 2,
VFAC4*Lat4 2,VFAC5*Lat5 2]];
LatT=Transpose[Join[VFAC1*Lat1*RAMP,VFAC2*Lat2*RAMP,VFAC3*Lat3*RAMP,VFAC3*Lat3*RAMP,
VFAC4*Lat4*RAMP,VFAC5*Lat5*RAMP]];
Long=Transpose[Join[VFAC1*Long1,VFAC2*Long2,VFAC3*Long3,
VFAC4*Long4,VFAC5*Long5]];
LongSQ=Transpose[Join[VFAC1*Long1 2,VFAC2*Long2 2,VFAC3*Long3 2,
VFAC4*Long4 2,VFAC5*Long5 2]]
LongT=Transpose[Join[VFAC1*Long1*RAMP,VFAC2*Long2*RAMP,VFAC3*Long3*RAMP,
VFAC4*Long4*RAMP,VFAC5*Long5*RAMP]];
LatLong=Transpose[Join [VFAC1*Lat1*Long1,VFAC2*Lat2*Long2,VFAC3*Late3*Long3,
VFAC4*Lat4*Long4,VFAC5*Lat5*Long5]];
VTEC=Transpose[Join[VFAC1,VFAC2,VFAC3,VFAC4,VFAC5]];
VTECT=Transpose[Join[VFAC1*RAMP,VFAC2*RAMP,VFAC3*RAMP,
VFAC4*RAMP,VFAC5*RAMP]];
VTECT2=Transpose[Join [VFAC1*RAMP2,VFAC2*RAMP2,VFAC3*RAMP2,
VFAC4*RAMP2,VFAC5*RAMP2]];
Bias1=Transpose[Join[UNIT,ZERO,ZERO,ZERO,ZERO]];
Bias2=Transpose[Join[ZERO,UNIT,ZERO,ZERO,ZERO]];
Bias3=Transpose[Join[ZERO,ZERO,UNIT,ZERO,ZERO]];
Bias4=Transpose[Join[ZERO,ZERO,ZERO,UNIT,ZERO]];
Bias5=Transpose[Join[ZERO,ZERO,ZERO,ZERO,UNIT]];
d=Transpose[Join[T1,T2,T3,T4,T5]];
G=Transpose[{VTEC,VTECT,VTECT2,Lat,LatSQ,LatT,Long,LongSQ,LongT,
LatLong,Bias1,Bias2,Bias3,Bias4,Bias5}];
(*This does the computation with Sats GPS-2,27,15,19,31
6/29/93 11:12:00–13:11:30*)
m=Inverse[Transpose[G].G].Transpose[G].d
```

TABLE 6

{16.15561320487896307, 2.188019385116895005, −2.33283, −0.67497, −0.0762195,
−0.160922, 0.04232815576283205117, 0.005452618645206662004,
0.2165989644332373481, −0.025015, 3.416605451100755291, −1.43928,
−0.683089, 1.455541304988761003, −3.37274}

Figure 3:
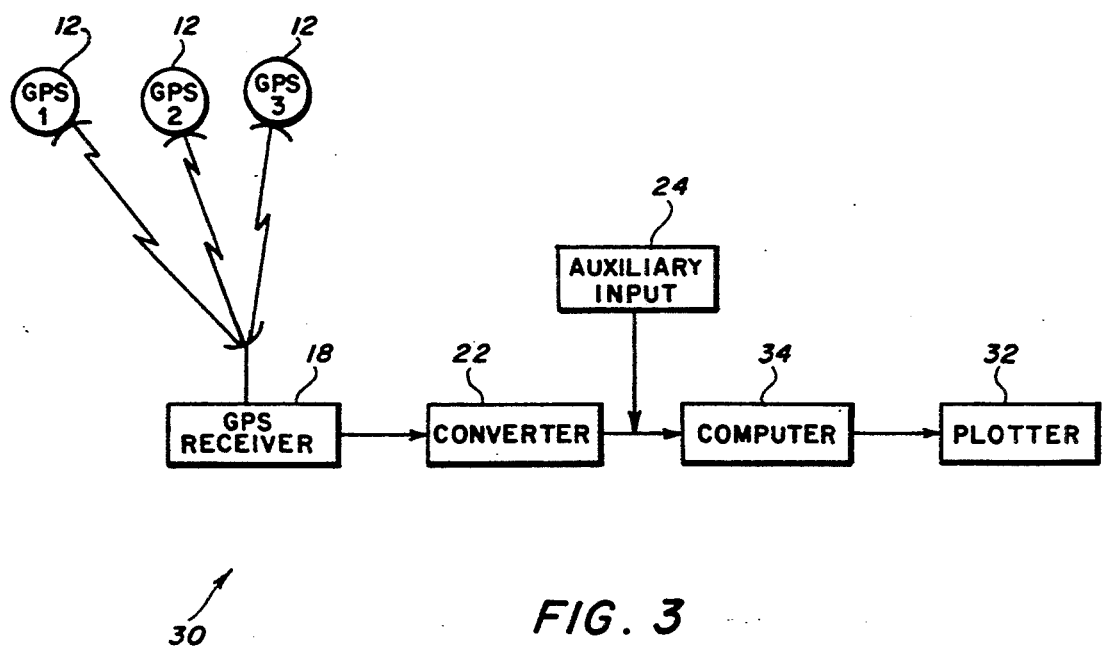
FIG. 3 depicts system architecture for the apparatus for constructing a space-time map of the total electron content (TEC) of the ionosphere utilizing a single computers.

In a second preferred embodiment, FIG. 3, only one computer 34 is required for all computational sequences. All functions within the system 30 that perform as previously described are numbered similarly.

This invention is satisfactory for the determination of SV differential delay biases. For this purpose, the transformation is well defined and one-to-one, which is the primary requirement. The integrity of the second order expansion can affect the results, however, the criteria for eliminating data outside the range of validity of the invention has been indicated. The agreement with the SV biases obtained by the Jet Propulsion Laboratory (JPL), of the California Institute of Technology of Pasadena, Calif., technique of ionospheric measurement shows that significant benefit is to be gained from the procedures set forth for using the second order unconstrained space-time model for VETC set forth above. Having obtained substantial agreement with the JPL SV biases, an experimenter may want to adopt these JPL biases, thereby removing them from the list of unknowns to be determined from the least squares analysis, and concentrate on the problem of ionospheric specification. Alternatively, by keeping SV and receiver biases in the problem, one obtains their sum from the least squares analysis. If the SV biases are known, the receiver can be accurately calibrated.

Utilizing the afore-stated apparatus and method of computation of the vertical total electron content utilizing a single global positioning system (GPS) receiver obtaining data from the global positioning system satellites, a space-time modelling of the ionosphere in the neighborhood of the receiver and the space vehicle bias without constraints on temporal data can be obtained more cheaply than presently obtainable. The method and apparatus described herein allows for both day and night ionospheric mapping. The receiver must be of a type that can receive the downlink data from the satellites, however storage of the data my be accomplished in a separate storage device.

By obtaining real-time or magnetically recorded data from observatories located world-wide, a ionospheric map of the Earth's atmosphere may be constructed.

Although the invention has been described in relation to exemplary preferred embodiments thereof, it will be understood by those skilled in this art that still other variations and modifications can be affected in these preferred embodiments without detracting from the scope and spirit of the invention.

What is claimed is:

1. An apparatus for producing an atmospheric ionospheric map comprising:
    means for receiving compressed digital data in a binary code format from a plurality of global positioning system (GPS) satellites said data defining the satellite operating parameters;
    means for decompressing the satellite operational data and converting it to an ASCII code;
    means for adjusting the ASCII coded data for any out of phase data;
    means for computing a slant range total electron content (TEC);
    means for computing a vertical total electron content (VTEC) of the ionosphere so as to produce an ionospheric map; and
    means for displaying the ionospheric map.

2. The apparatus of claim 1 wherein the means for computing the vertical total electron content (VTEC) of the ionosphere utilizes an inverse least squares (ILS) method modelling of temporal and spatial behavior of the atmosphere to the second order.

3. The apparatus of claim 1 wherein the means for adjusting the ASCII coded data for any out of phase data, means for computing a slant range total electron content (TEC), and means for computing a vertical total electron content (VTEC) of the ionosphere so as to produce an ionospheric map on at least one digital computer.

4. The apparatus of claim 1 wherein the means for displaying the ionospheric map is a plotter capable of generating an x-y-z plot of the vertical total electron content (VTEC) in reference to the longitude and latitude an observing station.

5. A method for constructing an ionospheric map comprising the steps of:
    receiving satellite operating parameters from a global positioning system (GPS) satellites in a compressed digital binary code format;
    decompressing the compressed digital binary coded satellite operating parameters;
    converting the binary code format into an ASCII format;
    storing the ASCII formatted satellite operating parameter for a predetermined period of time;
    adjusting the ASCII formatted satellite operating parameters for any data out of phase;
    computing a slant range total electron content (TEC) of the ionosphere from the ASCII formatted satellite operating parameters;
    repeating the above steps for a plurality of global positioning system satellites;
    computing a vertical total electron content (VTEC) using inverse least squares method modelling of the temporal and spatial behavior of the atmosphere to second order; and
    displaying an x-y-z plot of the vertical total electron content (VTEC) in reference to a latitude and longitude of an observing station to produce a local ionospheric map.

6. The method of claim 5 further comprising the step of recording the vertical total electron content (VTEC) computed and latitude and longitude of a plurality of observing stations located world-wide.

7. The method of claim 6 further comprising the step of producing a x-y-z plot of said world-wide data observations of vertical total electron content (VTEC) and the latitude and longitude of the plurality of observing stations to produce a world-wide ionospheric map.

8. An apparatus for producing an atmospheric ionospheric map comprising:
    means for receiving compressed digital data in a binary code format from a plurality of global positioning system (GPS) satellites said data defining the satellite operating parameters;
    means for decompressing the satellite operational data and converting it to an ASCII code;
    means for adjusting the ASCII coded data to remove any ambiguity in the satellite operational data;
    means for computing a slant range total electron content (TEC) of the ionosphere;
    means for computing a vertical total electron content (VTEC) of the ionosphere;
    means for plotting the slant range total electron content versus vertical total electron content to produce an ionospheric map; and
    means for displaying the ionospheric map.

9. A method for constructing an ionospheric map comprising the steps of:
- receiving satellite operational parameters from at least one global positioning system (GPS) satellite in a compressed digital binary code format;
- decompressing the compressed digital binary coded satellite operating parameters;
- converting the binary code format into an ASCII format;
- storing the ASCII formatted satellite operating parameters for a predetermined period of time;
- adjusting the ASCII formatted satellite operating parameters for to remove any ambiguity in the satellite operating parameters;
- computing a slant range total electron content (TEC) of the ionosphere from the ASCII formatted satellite operating parameters;
- repeating the above steps for a plurality of global positioning system satellites;
- computing a vertical total electron content (VTEC) using inverse least squares method modelling of temporal and spatial behavior of the atmosphere to second order;
- plotting the slant range total electron content versus vertical total electron content to produce an ionospheric map; and
- displaying an x-y-z plot of the vertical total electron content (VTEC) in reference to a latitude and longitude of an observing station to produce a local ionospheric map.

* * * * *